United States Patent [19]

Maze et al.

[11] Patent Number: 4,659,355
[45] Date of Patent: Apr. 21, 1987

[54] PROCESSES OF MANUFACTURE OF FLUORIDE GLASS FIBERS AND OPTICAL COMPONENTS

[75] Inventors: Gwenael Maze; Vincent Cardin, both of Rennes, France

[73] Assignee: Le Verre Fluore S.A., France

[21] Appl. No.: 729,273

[22] Filed: May 1, 1985

[30] Foreign Application Priority Data

May 7, 1984 [FR] France .................................. 84 07181

[51] Int. Cl.$^4$ .............................................. C03C 25/02
[52] U.S. Cl. ..................................... 65/3.12; 65/3.20; 65/2; 65/60.5; 65/DIG. 16
[58] Field of Search ...................... 65/3.20, 3.12, 60.5, 65/60.8, 2, DIG. 16

[56] References Cited

U.S. PATENT DOCUMENTS

| | | | |
|---|---|---|---|
| 4,154,592 | 5/1979 | Bailey | 65/3.2 |
| 4,161,505 | 7/1979 | Shiraishi et al. | 65/3.12 |
| 4,165,223 | 8/1979 | Powers | 65/3.12 |
| 4,249,925 | 2/1981 | Kawashima et al. | 65/DIG. 16 |

*Primary Examiner*—Arthur Kellogg
*Attorney, Agent, or Firm*—Laff, Whitesel, Conte & Saret

[57] ABSTRACT

A process for manufacturing optical fibers and components from bars or molds of fluoride glass draws out optical quality molds from highly pure glass. The glass is stretched or fibered into optical fibers in a dry atmosphere free of dust, organic, metallic or mineral vapors. The process leads to a low hydroxyl content fluoride glass which is used in the manufacture of optical fibers and components. The dehydration of the fluoride mixture occurs during the steps of prolonged heating at under 450° C. in the presence of fluoride or ammonium-bifluoride, and of holding the molten mixture at a high temperature until dehydration occurs. The drawing out, stretching, and fibering are carried out in a vacuum.

22 Claims, 9 Drawing Figures

PROCESSES OF MANUFACTURE OF FLUORIDE GLASS FIBERS AND OPTICAL COMPONENTS

The present invention is concerned with manufacturing processes for optical fibers and components made of fluoride glass using fluoride glass molds or bars. It also is concerned with apparatus intended to carry out the process of the invention.

THE STATE OF THE TECHNOLOGY

The use of fluoride glass for optics was suggested, for the first time, in patent FR-A- No. 2 336 961. In that patent, various processes to prepare molds and fibers from fluoride glass, such as those described in patents FR-A- No. 2 354 977 and FR-A- No. 2 384 724 were described. Although these techniques have been carried out successfully for the preparation of molds, it turned out that the latter fibering of these could not validly be done under conventional conditions, for example using an ambient air resistive oven. In fact, at the fibering time, a number of surface impairments appeared located on the striction cone of the mold and which included a large number of irregularities along the fiber which is fragile and not of constant diameter. Under these conditions, we cannot easily cover the fiber with a polymer sheathing. Given its mediocre mechanical and optical qualities, the fiber obtained is improper for any industrial use.

In an article titled "TEFLON FEP-CLAD FLUORIDE GLASS FIBRE" by Mitachi et al., published in the technical journal Electronics Letters, pp. 128–129, vol. 17, No. 8 of the Feb. 8, 1981, a method to allow the practical solution of this problem was described. Essentially, the fluoride glass mold, having a core and sheath of inferior index, is covered by a polytetrafluoroethylene plastic. This polymer, with high thermal constants, is then made into fiber at a temperature in the neighborhood of 400° C. at the same time as the glass. Under these conditions, the surface phenomena described above are avoided and substantial lengths of fibre with a somewhat constant diameter have been obtained Unfortunately, this process introduces some inconvenience. First, it assumes that the fibering temperature is not much different from that of the polytetrafluoroethylene. However, in the case of fibering aluminum-fluoride types of glass which are very rich in alcalines, the fibering becomes impossible or very random because these types of glass have thermal characteristics very distant from those of tetrafluoroethylene. In other respects, this polymer is required as a protective sheath for the optical fibre. This constitutes a serious handicap since it is relatively porous. Because of this, it allows the diffusion of ambient humidity to the surface of the fluoride glass. The water molecules then combine with the fluoride molecules, such as HF, $CF_4$, $C_2F_6$, produced during the fibering and trapped under the sheathing. After a time lapse varying, from a few days to a few months, the fiber loses its optical and mechanical qualities. The lack of reliability precludes any practical use. Finally, with this process, it is obviously not possible to obtain bare fibres which are after all necessary components or intermediate products required for some realizations.

ANALYSIS OF DIFFICULTIES TO OVERCOME

As has been observed previously, a number of difficulties are encountered during the stretching of a glass bar or a mold to manufacture a fiber with acceptable mechanical and optical qualities. The first phenomenon whose mechanism and evolution are relatively well known is the recrystalization of the glass. Glass is by nature, a metastable coagulated liquid while the thermodynamically most stable state is that of crystalized solids in which the spatial distribution of the atoms follows rigorous geometric laws that result in a three-dimensional periodicity. At ambiant temperature, the movements of atoms resulting from thermal agitation are too small to allow a structural reorganization, thus leading to a mixture of crystalized phases. In practice, the release times are very high, as long as the temperature is below the glass transition temperature $T_G$. In revenge, above this temperature, the release times decrease so as to become comparable to the timing parameters of the fibering instrument like warm-up speed, isothermal layer, etc.

We can, for each temperature define a time at the end of which a given fraction of the glass will be crystalized, for example $10^{-5}$ or $10^{-6}$ times the total volume. Observation of the evolution of this characteristic time leads to Temperature-Time-Transformation (T.T.T.), curves, which are characteristics of the glass considered. Since the fibering must necessarily be done at a temperature where the viscosity is suitable, that is 1000 to 10000 poises, we must necessarily be at a temperature where the characteristic time has a finite value, sometimes very short. For some fluoride glass, such as the 60 $Z_rF_4$ or 40 Ba $F_2$ composition glass this makes fibering apriori almost impossible. For more stable fluoride glass, for example those which contain La, Zr, Ba, Al, this time may be a number of minutes or more. An essential condition to a satisfactory fibering is thus that the heating time of the glass to the fibering temperature be somewhat less than the crystalizing time to this temperature.

It is fitting to observe that the above-mentioned considerations concern only homogeneous type recrystalization which depends only on the composition of the glass. In real experimental conditions, we observe other devitrification phenomena which are linked to heterogeneous mechanisms.

In particular, reactivity of fluorides at high temperatures is a well known phenomenon which translates itself, for example, by corrosions or pollutions. In the case of fluoride glass, the surface constitutes the critical area of the principal chemical phenomena affecting the physical properties of the glass. If we limit the analysis to the reactions between the solid and the gaseous states, it is apparent that gasses such as nitrogen $N_2$ or oxygen $O_2$ do not induce discernable chemical transformations: However, the water vapor is particularly corrosive. The reaction diagram can be written in two forms:

$$MF_n + H_2O \rightarrow MF_{n-1}OH + HF \qquad (1)$$

$$MF_n + H_2O \rightarrow MF_{n-2}O + 2HF \qquad (2)$$

In the first case, a fluoride is isostructurally replaced by a hydroxyl $OH^-$, of similar bulk. In the second case, two fluorides are exchanged with one oxygen, thus implying a slight modification to the structure. In all cases, the assault results in the introduction of oxygen in the fluoride material. This is a general phenomenon that occurs as well with crystalized fluorides as with glass. A simple thermodynamic approach which was confirmed through experimental observation shows that the reaction (1) is most active at low temperature while the reaction (2) tends to occur at a higher temperature, in particular when the fluorides are in a liquid state. This chemical change induced from the surface, leads to important consequences on the exact optical properties affected and, in particular, we observe an absorption band at 2.9 microns. The refraction index varies slightly. In fact, the polarizability of OH is different from that of $F^-$. With the devitrification being closely correlated to the composition, the introduction of oxygen usually accelerates the crystalization speed such that at a given stage of the hydrolysis, oxyfluorides are created and behave like heterogeneous crystalization seeds. Since the metal oxygen links are stronger than the metal fluoride links, this has a tendency to increase the local viscosity of the liquid phase and to create oxygen rich and denser microdomains which will later be the source of intense diffusion.

Under certain conditions, these microdomains are susceptible to regroup on the surface of the glass, a quasihomogeneous phase with physical properties slightly different from those of the basic fluoride glass. This new surface state behaves like a glass with higher chracteristic temperatures. From this fact, its viscosity is always greater to that of the glass from which it originated. This splitting of state thus results in the formation of a "skin" on the surface of the glass. Instead of observing the smooth surface resulting from the "fired polish", we observe the appearance of wrinkles, stripes and other roughness. During the stretching of the bar or of the optical fibre molds, the striction cone displays a characteristic "skirt" whose location leads to a number of defects along the fiber, such as beading, narrowing and irregular deposits. These defects generate important mechanical constraints during cooling and furthermore the fibre is fragile and brittle.

This splitting of state, whose consequences appear disastrous for the optical fibres is governed by a number of factors. In the first case, the assault by humidity, which continuously increases the concentration of oxygen constitutes a leading parameter. In fact, the phenomenon is tied to the number of oxygen rich microdomains. In other respects, the grouping of these microdomains into the quasihomogeneous surface layers appear to be favored and accelerated by impurities external to the glass such as various dusts, organic molecules, silicon and silicates, oxidies, metallic vapors, carbon and carbines. Thus the factors external to the glass such as atmosphere, humidity, dust, reveal themselves to be as critical as the characteristics of the glass itself which is the cationic purity, the concentration of oxygen and OH, the homogeneous nucleation speed and the viscosity.

The last but no lesser problem is that of the chemical and mechanical reactions of the fiber. We have, for example, observed that water molecules from the atmosphere come and adhere to the surface of the fluoride glass pieces. This phenomenon again translates itself into an optical absorption at 2.9 microns. In an aqueous solution, this attachment is even more important and leads to a rapid degradation in the surface of the glass because some parts of it transfer to the solution. This degradation in the state of the surface results in extreme brittleness in the fibers which thus resist pulls, bends and vibrations very poorly.

AIM OF THE INVENTION

One aim of the invention consists in providing a process allowing a slight reduction in the inconvenient effects mentioned above, by resolving a set of problems encountered during the drawing of suitable quality fibers.

PREPARATION OF THE GLASS

The first stage in the manufacturing of fibers is the synthesis of high quality fluoride glass. The glass must obviously be homogeneous and free from bubbles and unmelted particles, but it should also only have a very small oxygen and hydroxyl content. The tolerance for these are very low, of the order of a few parts per billion or even less depending on the optical transmission quality that we wish to achieve in the neighbourhood of three microns. The residual concentration of oxygen may be higher providing that it is homogeneously distributed through the bulk of the glass. In fact, it is the splitting of the phase in the bulk and at the surface which is critical and not the oxygen.

The preparation of the glass can be carried out using two conventional ways; either through the direct melting of anhydric fluoride, or in two steps through fluorization of oxides by ammonium bifluoride followed by the melting of the mixture of constituent parts.

The first method implies that the starting fluorides be rigorously anhydrous, which implies that on a scale of parts per million or parts per billion it is never achieved. They must then be previously dehydrated at the lowest possible temperature to avoid a hydrolysis phenomenon. This can be achieved by heating in a vacuum and a suitable combination of temperature and processing of the vacuum achieved and the pumping speed set to allow the effective removal of molecular water. Another possibility consists in heating the mixture with a bit of ammonium bifluoride whose fluorizing action inhibits hydrolysis, this allowing much higher temperatures and pressures. We can thus have conditions similar to the second method which uses oxide products to start with.

The chemical reaction between the oxides of zerconium, aluminum, thorium, rare earths and other cations, on one hand and ammonium fluoride $NH_5F_2$, on the other hand, produces an appreciable amount of water. It is only because the water vapor which has a vapor tension, eliminates itself more rapidly than the excess ammonium fluoride that this reaction can produce suitable quality fluorides. However, under normal reaction conditions, we observe the presence of oxygen and hydroxyl in the final product. This presence can be slightly reduced if we can lower the temperature or the pressure under which fluorization is carried out. In fact, in this case, the hydrolysis is slower and more limited because the maximum amount of water will have been eliminated at low temperature, promoting, in accordance with the law of chemical equilibrium, the formation of fluorides at the expense of oxifluorides. The reduction in temperature can be achieved at the expense of a longer processing time.

In acordance with a characteristic of the invention, the fluorization or the dehydration of the initial constituents are carried out by a prolonged heating at a temperature of under 450° C., in the presence of fluoride or ammonium bifluorides.

In accordance with the invention, the fluorization is achieved at a reduced pressure. The reduced pressure necessarily implies the requirement of a pumping system.

After fluorization, the temperature is increased and the mixture is brought to its melting point, the container now being under an anhydrous atmosphere. In order to further reduce the residual hydroxyl concentration, a thermal process is applied. At high temperature, the hydroxyls are spontaneously eliminated through the departure of the fluorohydric acids HF following the chemical reaction diagram.

$$F^- + OH^- \rightarrow O^{--} + HF$$

An increase in temperature raises the momentum of this reaction by decreasing the viscosity of the melted mixture and accelerates the diffusion of the gaseous molecules of HF through the liquid. One inconvenience of this method lies with the volatization of a portion of the zerconium fluoride which condenses itself in the form of a white smoke at the output of the crucible. It is thus necessary to modify the starting composition for the preparation in order to compensate for this loss. The temperature and duration of the process must be adapted to the bulk of glass and the geometry of the crucible. They may be in an excess of 1000° C. and 1 hour respectively for normal fluorozirconate glass. The efficiency of this refinement can be increased by using reactive atmosphere, such as CCl, as proposed in patent FR-A- No. 2 478 619.

The present invention, however, avoids this extra procedure through a simple increase in the refinement temperature. The atmosphere at the surface of the liquid has a given affect on the hydroxyl elimination level. It must obviously be anhydrous. We can see inert gasses, but the presence of oxygen does not constitute inconvenience. The reaction;

$$2F^- + \tfrac{1}{2}O_2 \rightarrow O^{--} + F_2$$

present a free positive energy at the temperatures considered and because of this is non-existent in the first approximation. In opposition, the reducing influence of the $NH^+_4$ ions during the synthesis of the glass can reduce the degree of oxidation of a small part of the cations leading to a grey coloring of the glass bulk. Traces of iron are found at the level 2 of oxidation and traces of the slightly electro positive metals such as zinc or platinum can even be reducee to the metallic state. A limited introduction at a high temperature results in the replenishment of cations to their highest curent oxidation level and thus to eliminate or reduce the optical losses due to absorption that they can induce.

In other respects, since the elimination of HF molecules at the surface of the liquid has a direct impact on the elimination of hydroxyls, it may be advantageous to accelerate it by a partial vacuum or by a gas promoting diffusion of HF molecules. Heliumis suitable for this diffusion and offers, among other things, the advantage of favorable thermal transfers. This method of preparation and refinement of glass allows the achievement of quality necessary to obtain molds.

MANUFACTURING OF MOLDS

The first process used for the drawing of fluoride glass molds is described in the above-mentioned patent FR-A- No. 2 396 981. It consisted in dumping the molten glass into a preheated mold, then after a given time removing the liquid core. We then emptied the glass from the core into the glass tube thus formed to achieve the conventional core sheath of index jump fibers. This process has a number of inconveniences in its primitive form. Firstly the tube has an internal conicity because within the mold, the first glass poured is at the bottom and cools faster than that which is poured at the top of the mold. On the other hand, the internal surface is exposed to the pollution of the atmosphere during the time interval which precedes the pouring of the core glass, which leads to the appearance of a number of core/sheath interface defects. Finally, under usual conditions, we cannot avoid the formation of bubbles on the axis on the cylinder.

With regards to the conicity of the core, in accordance with the invention, two solutions are proposed to obtain fibers with a constant core diameter.

In accordance with the invention, the external surface of a conic core mold is bored and polished such that the ratio of the core diameter to the sheeth—designated in the sequel by RCG—is constant over the whole length of the fibering mold, then the mold is fibered, the diameter of the fiber being measured and the fibering process controlling such as to obtain a constant diameter fiber.

In accordance with a variation of the invention, a mold of cylindrically tapered geometry, open towards the bottom is provided. Thus, the external surface of the glass sheath is cylindrically tapered instead of being cylindrical but its internal surface is cylindrical. The angle of the tip of the cone's trunk is chosen in relation to the characteristics of the glass and in particular the glass of the sheath. The external surface of the obtained mold is, preferably, ground and polished such as to obtain a mold with a cylindrical external surface.

ELIMINATION OF INTERFACE DEFECT POINTS

In accordance with the invention, the core/sheath interface defects can be avoided by carrying out all the operations in an anhydrous atmosphere and obviously free from dust, suspensions and metal impurities.

One way of proceeding to avoid the core/sheath interface defects consist in using a mold. in which we first pour the sheath glass, then above the sheath glass, the core glass. When we open the bottom of the mold, the central part of the sheath glass flows, followed by the central part of the core glass. When all the central part of the core glass has emptied we stop the pouring by closing the bottom of the mold. We thus have a mold with a glass sheath cylinder encircling the nucleus of core glass. All the operations—pouring, opening of the bottom, closing—are carried out in an anhydrous atmosphere, for example in a vacuum. We thus have a mold free of sheath/core interface defects.

Another possible realization of index jump molds consists of extruding glass at its melting point through a thread whose output orifice determines the external diameter of the mold. In practice, we superimpose above the threader a disc or core glass and below the threader a disc of sheath glass. These are heated and then pressed against the threader with a piston. Of course, the contact surfaces of the two discs must be very clean.

MANUFACTURING OF SMALL DIAMETER CORES

Among the inherent constraints of manufacturing optical fibers, that of the ratio between the diameters of core and the sheath is essential when manufacturing unimodal fibers, or, more simply, to realize good optical guiding conditions.

The methods described above do not allow an easy realization of small core dimensions. In accordance with the invention, first the manufacturing of a relatively large section mold with an RCG ratio equal to the definite RCG ratio of the fiber is provided. This primary mold is then stretched into a longer mold but with a small cross section. In this way, the core diameter of the stretched mold can be less than 2 or 3 mm for a sheath diameter of 8 to 10 mm. Essential conditions are necessary to realize this stretching. They are the homogeneity and stability of the temperature along with a clean and anhydrous atmosphere. The carrying out of the stretching, in accordance with the invention implies the precise control of these parameters.

ELIMINATION OF BUBBLES

It is also proposed, in accordance with the invention, to manufacture molds from tubes which are later contracted under vacuum or in an anhydrous and dust free atmosphere to avoid the formation of bubbles on the central axis.

Thus, in accordance with the invention, it is proposed to form two or more concentric tubes and then to contract the set up.

As an example, for this purpose, we successively pour two types of glass in a preheated cylidrical mold turning about its axis at a sufficient rotational speed to maintain the liquid glass in regular layers until its solidification. We recall that we may also use the previously used method consisting of pouring the sheath glass, then in letting its central part flow while the core glass replaces it, and removal of a portion of the core glass remaining liquid.

The tube obtained through one of the solutions which has been described usually has a relatively large internal diameter. We locally heat this tube to a temperature at which the glass offers a suitable viscosity.

The tube contracts from the effect of surface tensile forces and its diameter considerably reduces. By displacing the heating zone at a constant speed along the tube, the contraction zone progresses along. If necessary, we carry out a number of successive contractions until the emptied central portion disappears. We thus have a mold with no bubbles along its axis.

Preferably, the tube is rotated to avoid any deformations during the contraction process which has been described.

In other respects, in accordance with the invention, the whole contraction process is carried out in a vacuum or in an anhydrous and dust free atmosphere.

MANUFACTURING OF CAPILLARIES

We must observe that a mold fibering machine allows, not only to obtain fibers from bars but also capillary tubes when starting from tubular molds. Note that we can also obtain fibers directly from a tubular mold by adjusting the temperature and the thermal profile of the fibering oven.

MANUFACTURING OF COMPLEX ELEMENTS

In accordance with the invention, it is also proposed to assemble and/or shape bars, tubes, molds, fibers and capillaries, in order to obtain complex structures, the assembly of the basic components being carried out under vacuum and in an anhydrous and dust free atmosphere, by heating part or all of the set up at a suitable temperature such that at the periphery of adjacent components, the pieces of glass merge, the complex structures thus obtained then being stretched, contracted or fibered.

Of course, an assembly operation may consist of a mixture of operations of stretching, contraction or fibering.

DETAILED DESCRIPTION

Figure 1:
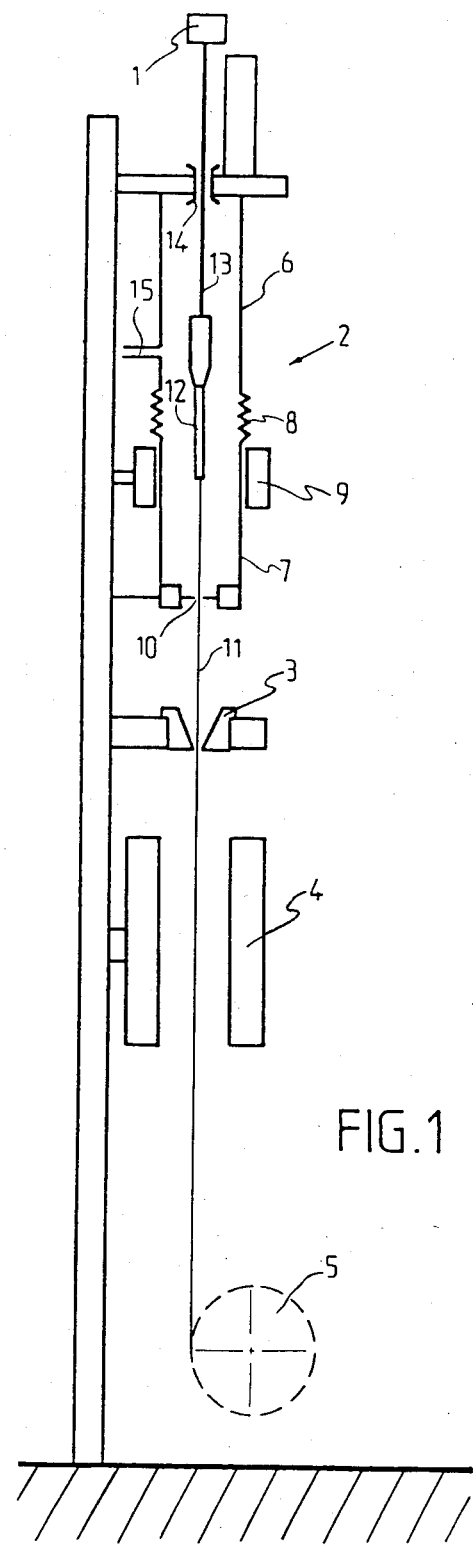
Figure 2:
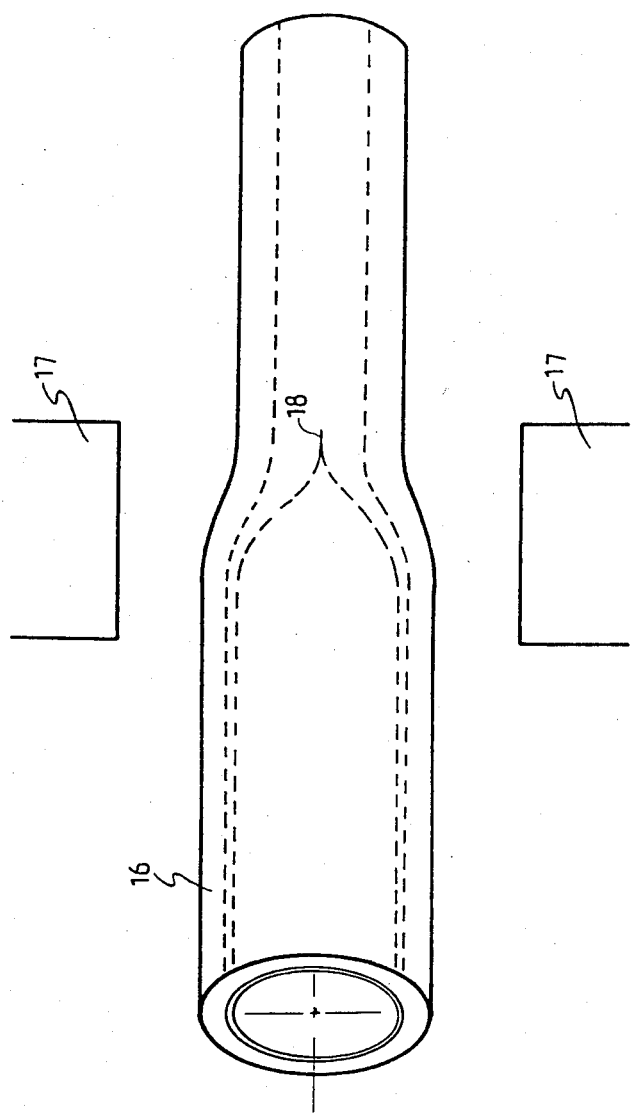
Figure 9:
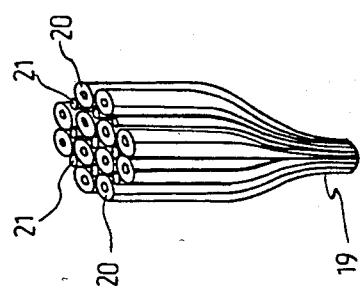

We have described above, methods to manufacture fluoride glass fiber as well as neighboring products, such as capillaries or intermediate products, such as molds or bars. The characteristics of these methods, as well as other characteristics of the invention, will become clearer upon reading the following description of apparatus used to carry out these methods and application examples of these methods, the said description being carried out in relation to the attached drawings among which:

FIG. 1 is a schematic cross-section of a fibering machine in accordance with the invention, FIG. 2 is a schematic illustrating the contraction process, FIGS. 3 through 8 show the attenuation as a function of wave-length, the measurements being carried out on fibers obtained as described in the example numbered below, and FIG. 9 illustrates the striction cone of the complex component obtained as we shall see in an embodiment.

The fibering machine of FIG. 1 comprises, from top to bottom, a mold hook-up apparatus 1, a fibering oven 2, a threader 3, a polymerizing oven 4, and a drum 5. The fibering oven 2 is made up of practically impervious walls consisting of two tubes of glass or silica 6 and 7 connected by a metallic gusset 8. The tube 7 is surrounded by a heating apparatus 9 below the gusset 8. The base of tube 7 is closed by a diaphram 10 through which the fiber 11 is pulled from mold 12 which is suspended to the hook up apparatus 11 by a pin 13. The top of tube 6 is also closed by a plate which has at its center an air tight passage in which the pin 13 can slide down.

In the example shown, the tube 6 has a small secondary tube 15 that allows the vacuuming of its walls or the introduction of purging gas, such as helium which is a good heat conductor.

The threader 3 allows the coating of the fiber 11 with a protective polymer envelope. Since the sheathing with a polymer is known, we have simply represented it by the presence of the threader 3.

The purpose of the gusset 8 is to allow the offsetting of the axis of tubes 6 and 7 such as to adjust the centering the fiber 11.

It should be observed that the correct fibering of mold 12 can only be achieved if the volume of the containing walls 6-7-8 is free of humidity and dust which, as was mentioned in the preamble, alter the surface of the striction cone.

The fibers produced with the machine of FIG. 1, with the oven 2 under vacuum, are of an excellent quality. By using helium as a purging gas, we facilitate the heating of mold 12 thus easing the fibering, but a constant gas flow around the mold should be achieved in order not to change the centering of the fibering. For the stretching or contraction operation of the tube, we must place the parts holding chuck and the heating apparatus inside of the container which must also be under vacuum or purged by an appropriate gas.

In FIG. 2 we have schematically showed how the contraction of a fluoride glass tube is carried out. The ends of the tube 16 are assumed to be held by the chucks, which are mounted on a machine capable of displacing them in translation to one another and to rotate them about the axis which joins them. An oven 17, such as a resistance oven, is placed between the trunks and surrounds the tube 16. During the heating process, the surface tensions act and the tube contracts, that is its external and internal diameters and in particular its internal diameter reduce considerably. The tube 16 is linearly displaced in front of the oven 17.

Depending on the initial dimension, a number of passes may be necessary to reduce the internal diameter to nothing, as shown in 18. It should be noted that, if we start with a tube composed of core glass and sheath glass, such as that shown in FIG. 2, the final RCG ratio depends on the initial ratio of core thickness to sheath thickness.

The machinery set up carrying the tube 16 and the oven 17 must be in an anhydrous dust free and impurity free atmosphere, either under a vacuum, or swept by an appropriate gas. The contraction process allows the elimination of bubbles.

We may also stretch tubes with a machine analogous to the one outlined in relation to FIG. 2. In this case, the chucks are subjected to forces which tend to pull them apart. Of course, the process is such that the internal diameter is not reduced to nothing.

For the above two cases, the rotation of the chucks avoids deformations due to a non-rigorous angular distribution of heat and finally due to gravity.

EXAMPLE 1

In practice, Example 1 concerns a number of trials in which the proportional molarity of the constituents was varied between the limits which follow. For each trial, a mass of 10 g of core glass was prepared by mixing in molar percentage 52-58% of $ZrO_2$, 1-3% of $La_2O_3$, 26-32% of $BaF_2$, 2-5% of $ThO_2$, 1-2% of $Al_2O_3$, 2-12% of NaF and 20 g of $NH_5F_2$. The mixture was heated during 2 hours at 400° C., then brought to its melting point at a heating speed of 10° C./mn. A refinement stage was achieved by heating the liquid glass to 1000° C. during 30 minutes. The crucible was then cooled to 600° C.

A mass of 50 grams of sheath glass was then prepared following the same process mode with 54-60% of $ZrO_2$, 1-3% of $La_2O_3$, 28-35% of $BaF_2$, 1-3% of $Al_2O_3$ and 100 grams of $NH_5F_2$.

In both cases the synthesis was carried out in a platinum crucible (height 15 cm, diameter 20mm) and in the anhydrous atmosphere of a glove box. A suction and purging apparatus allowed the removal of vapors resulting from the chemical reaction and the sublimation of $NH_4F$.

The sheath glass was poured into a brass mold with internal diameter of 10 mm leading, after the removal of the non-solidified central portion to a tube of 2.5+/−0.5 mm thickness. The core glass was then immediately poured inside this tube, as we have described above in the case where we superposed in one mold core glass with sheath glass. The part was then reheated during one hour at 320° C. The mold was then cut at the ends, then ground and externally polished. It thus appears in the form of a cylinder of 50 mm in length.

The fibering of this mold was carried out in containing walls swept with a dehydrated flow of aluminum at a rate of two 1/mm. The joule effect maximum of 300 W at 80 V. The fibering is carried out at 390° C., at a stretching speed of 15 m/mn. We thus obtain a bare fiber with an external diameter of 14 microns for a core diameter of 70 microns. An ultraviolet coating with polymerizable metacrylic (RIPOLIN PHOTOCRYL resin) is then linearly carried out, resulting in a coated fiber with a diameter of 240 microns. A fiber of total length of 250 meters is thus obtained.

Figure 3:
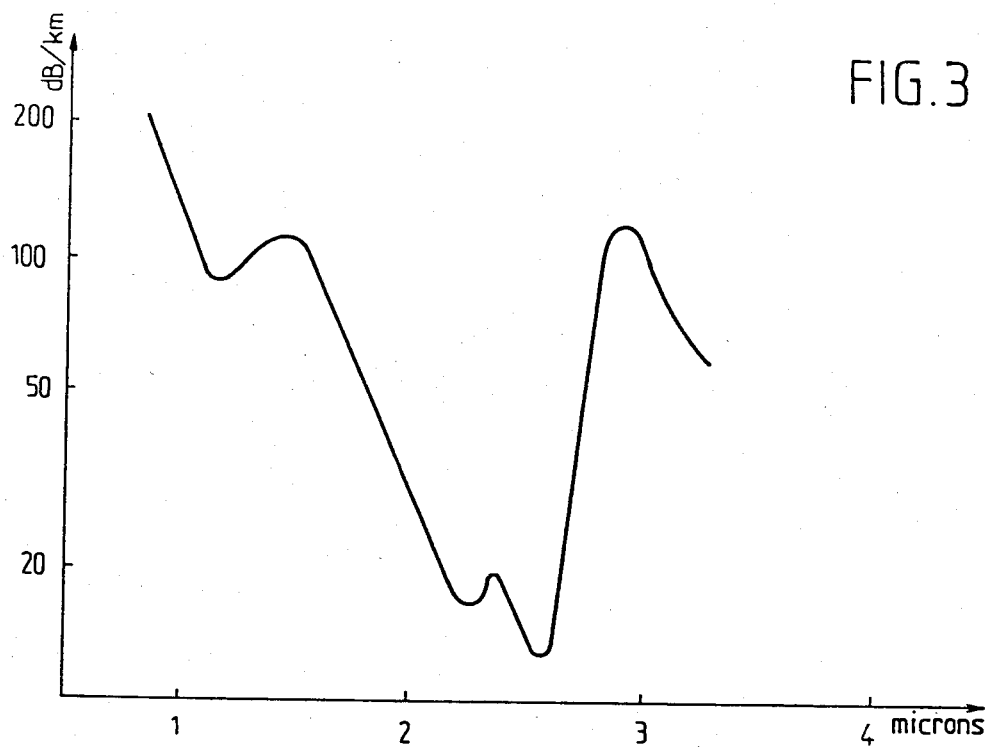

The measurement of the optical transmission characteristics for 60 meters of the central trunk are shown in FIG. 3. We observe a reduction in attenuation right from the visible light through to the average infrared. The lowest attenuation occurs at 2.6 microns, while a substantial absorption occurs at 2.9 microns due to residual hydroxyls present in the glass.

EXAMPLE 2

Following a similar process, a pair of core and sheath glass was prepared. The initial product composition was (in molar percent);

|  | $ZrF_4$ | $BaF_2$ | $LaF_3$ | $PbF_2$ | $ThF_4$ | $AlF_3$ | NaF |
|---|---|---|---|---|---|---|---|
| Core | 56 | 25 | 5 | 5 | 4 | 5 |  |
| Sheath | 54 | 30 | 5 | 1 | 1 | 5 | 4 |

After a refinement at 400° C. for 30 minutes, the glasses were respectively poured as mentioned above, into a brass apparatus covered with a gold coating on all surfaces coming in contact with the glass, the core glass being poured above the sheath glass, then the bottom of the mold was removed for a certain period of time. The mold was preheated to 280° C. at the time of the pouring. A mold with an external diameter of 10 mm and a length of 60 mm with an RCG ratio of 0.5 was obtained.

Figure 4:
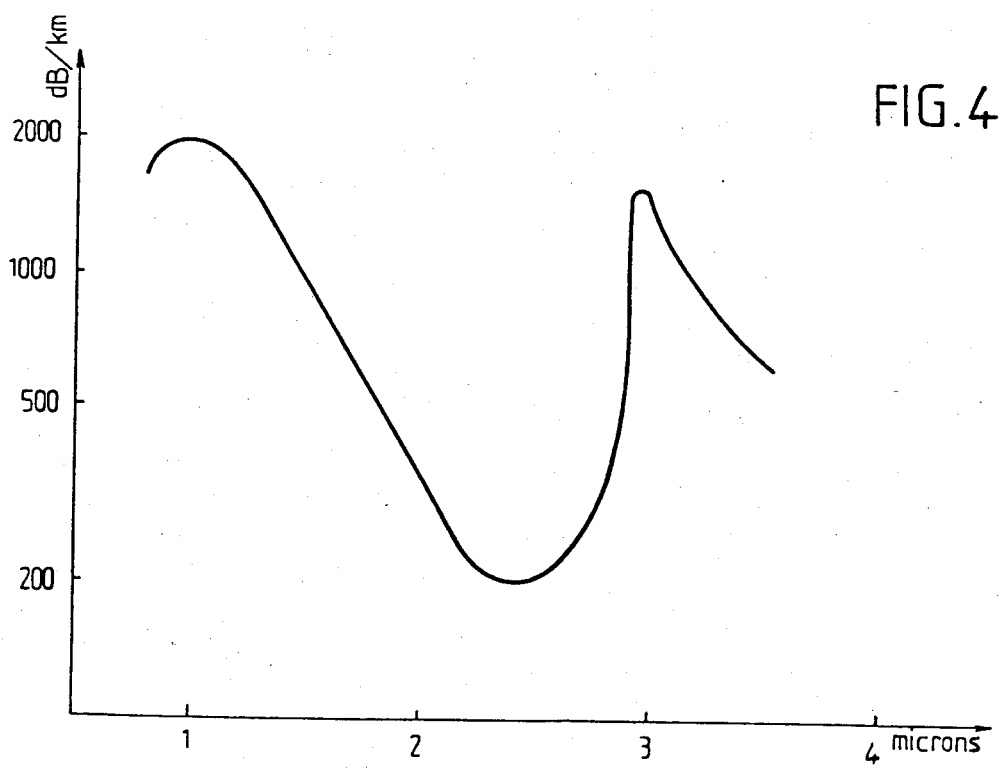

The fibering was carried out with the same system as that of example 1, at a temperature of 390° C. and at a stretching speed of 15 m/mn. The coating of the fiber with a polymerized silicon result (SYLGARD resin) was achieved by passing the fiber through an oven of 0.8 m long and heated at 370° C. The spectral loss curve for a 30 m long trunk is shown in FIG. 4. A minimum attenuation of 220 db/km is observed at 2.4 microns.

EXAMPLE 3

Starting from core and sheath glasses whose compositions were given in example 2 and which were prepared in the same manner, two glass discs of thickness 6 mm and diameter 50 mm were obtained. We then placed these two discs one above the other—the core glass at the bottom—in an extrusion apparatus. They were then heated to 340° C. and extruded through a 10 mm diameter orifice of an appropriately shaped stainless steel threader. During extrusion, the portion of glass from the top discs forms the core of the extruded mold, whose external diameter is obviously 10 mm and whose length is 150 mm.

The fibering is carried out in the same way as in example 2.

EXAMPLE 4

Two types of glass, whose compositions are given below, are synthesized following the same operational process as in the preceding examples;

|  | $ZrF_4$ | $BaF_2$ | $LaF_3$ | $AlF_3$ |
| --- | --- | --- | --- | --- |
| Core | 58 | 34 | 5 | 3 |
| Sheath | 56 | 34 | 5 | 5 |

The refinement was carried out in a commercial argon atmosphere, containing a small quantity of residual oxygen, but dehydrated by passing it through a molecular strainer. The temperature was stabilized at 910° C. for 40 minutes. The glass was poured into an 11 mm diameter and 120 mm long gold plated brass mold with a conicity of 5%. After removal of the liquid core and pouring under a clean dry atmosphere from the core glass we obtain a slightly conical mold which is corrected by grinding and polishing. The diameter of the core is of 5±0.2 mm.

Figure 5:
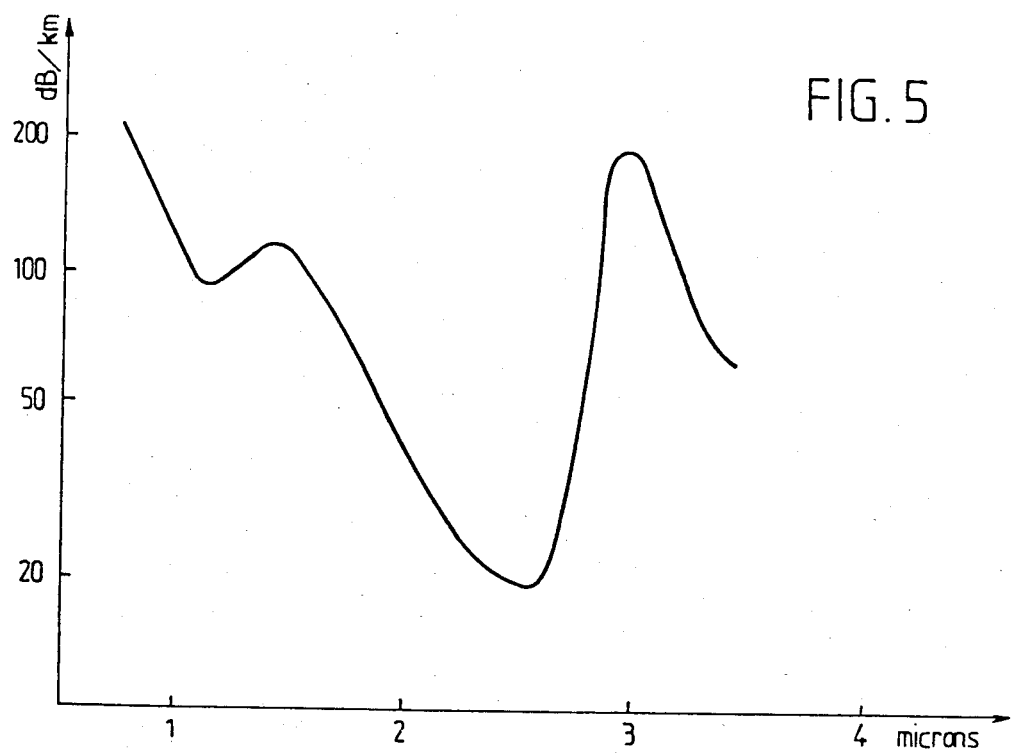

The fibering is carried out in the same way as in example 1. We then obtain a fibre with the following dimensions; an external diameter of 240 microns, a sheath diameter of 150 microns and a core diameter of 75 microns. The spectral characteristics measured for a 60 m length of fiber are shown in FIG. 5.

EXAMPLE 5

Two fluoroaluminate types of glass were prepared from $Al_2O_3$, $ThO_2$, $BaF_2$, $V_2O_3$ oxides and $NH_5F_2$ bifluoride in order to obtain the following moler composition (in percent),

|  | $AlF_3$ | $ThF_4$ | $BaF_2$ | $YF_3$ |
| --- | --- | --- | --- | --- |
| Core | 25 | 22 | 25 | 28 |
| Sheath | 30 | 20 | 20 | 30 |

Fluorization was carried out at 400° C. for two hours and the refinement was at 1000° C. for 60 mn. A 10 cm pin and 12 mm in diameter mold was obtained by pouring sheath glass into a gold plated brass mold at 430° C. then removing the liquid core and pouring from the core glass.

Figure 6:
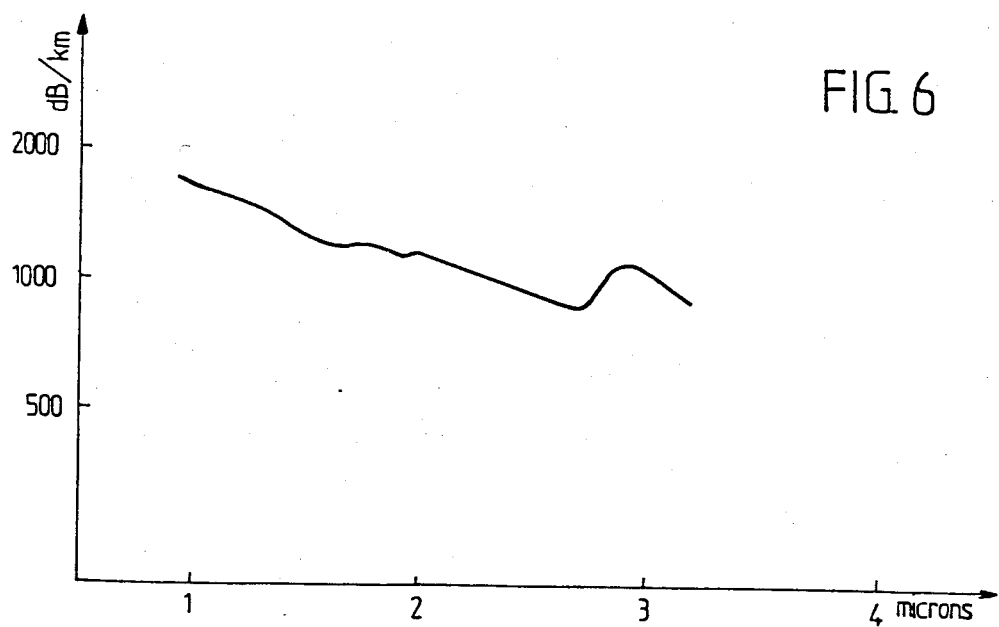

The fibering was carried out at a temperature of 490° C. under a dry helium flux with a fibering oven having an active feeding zone of 4 mm. The optical transmission characteristics of the fiber obtained are shown in FIG. 6.

EXAMPLE 6

A zinc fluoride based glass was prepared from compositions of $ZnF_2$, $ThO_2$, $BaF_2$, $V_2O_3$, $ZrO_2$ and $NH_5F_2$ bifluoride mixed in the following nominal proportions;

| $ZnF_2$ | $BaF_2$ | $YF_3$ | $ThF_4$ | $ZrF_4$ |
| --- | --- | --- | --- | --- |
| 32.5 | 25 | 14 | 32.5 | 6 |

Figure 7:
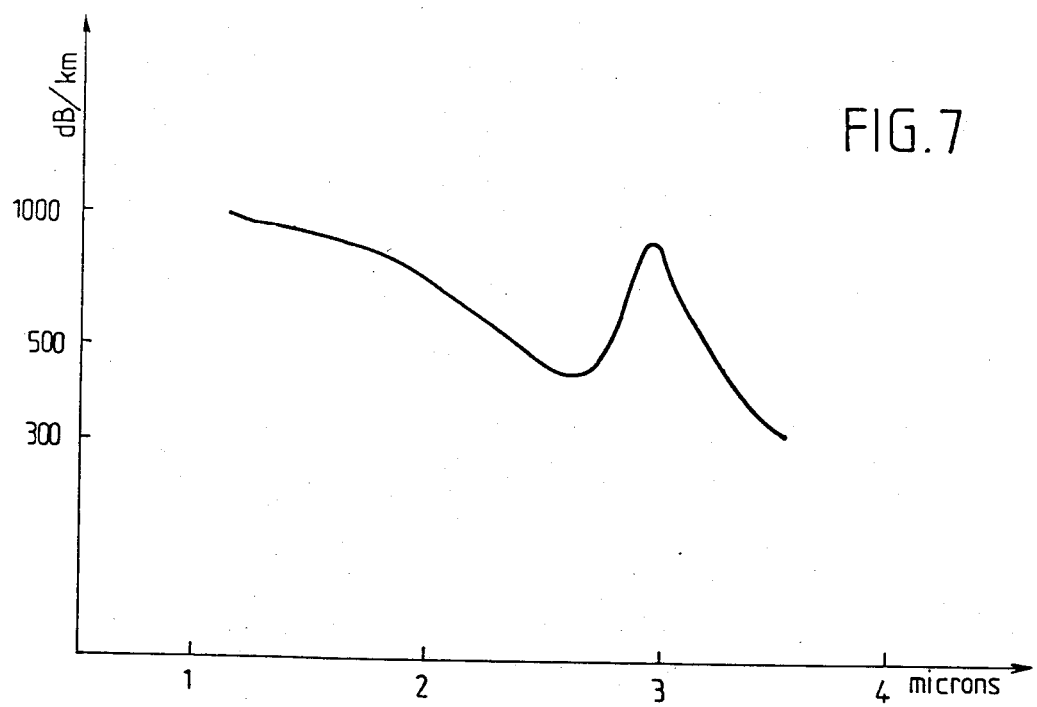

Based on approximately 50 g, the synthesis of this glass is carried out by heating at 400° C. for 2 hours, then the product is refined for two hours at 1000° C. and finally cooled to 850° C. and poured. A bar of glass was made and the fibering achieved with the previously described oven, but at a temperature of 520° C., allowing one to get a single fiber of 150 microns in diameter. The corresponding spectral loss curve is shown in FIG. 7.

EXAMPLE 7

From the two glasses of example 1 and following the same processing step, a primary mold of core diameter 12 mm, of sheath diameter 24 mm and of 150 mm length is obtained by pouring core glass in the sheath tube. This primary mold is then introduced within clean closed walls where gases are removed by a secondary vacuum, then heated in its central part under dry argon at 35° C. and then stretched in a strengthening instrument as outlined above until its external diameter reaches 10 mm. The stretched part is then cut and makes up the secondary mold with an RGC ratio of 2.

Figure 8:
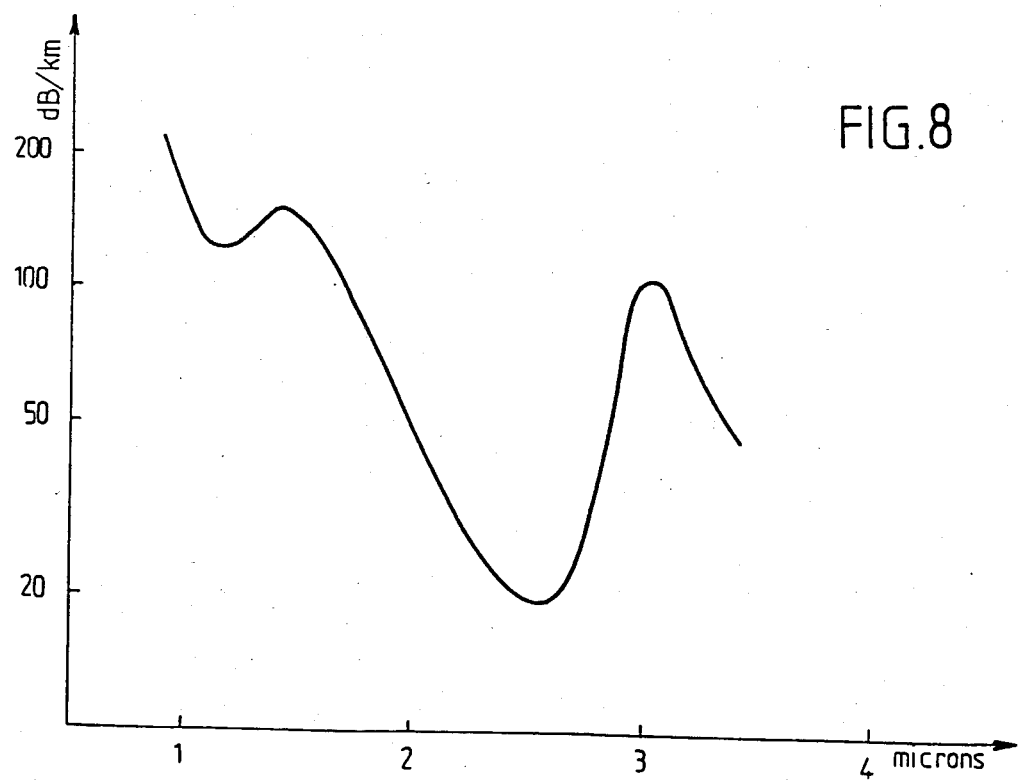

The fibering and coating are then carried out in accordance with the process of example 1. At a stretching speed of 15 m/mn, we obtain fibers having an external polymer sheath and an external diameter of 140 microns and a core diameter of 70 microns. The spectral transmission curve is shown in FIG. 8.

EXAMPLE 8

From the pair of glasses of example 1, synthesized following the same process, we have realized a sheath glass tube with an external diameter of 16 mm and a thickness of 5 mm. This tube was then stretched, in a stretching instrument as outlined above, at a temperature of 350° C. in accordance with the process described in the preceding example, until a tube of 15 mm in diameter and 2 mm in thickness was obtained. It was then transferred under a dry atmosphere into a clean enclosure where it was then filled with the core glass.

After fibering in a clean and neutral ambient environment, we obtained an optical fiber with a sheath diameter of 240 mm and an RGC ratio very close to 1, thus appreciably increasing the useful cross section of the fiber and consequently the light flux that it can transport.

EXAMPLE 9

From the pair of glasses from example 1, a tube with an external diameter of 20 mm was prepared. The sheath glass was poured at a thickness of 4 mm and that of the core had a thickness of 2 mm by using a centrifugal process at the time of the pouring. The tube thus obtained was heated to 390° C., then under a clean and anhydrous atmosphere it was stretched until a tube with an external diameter of 15 mm and an internal diameter of 4.6 mm was obtained. This tube was then stetched into the form of a capillary fiber of external diameter 65 microns and internal diameter 20 microns.

EXAMPLE 10

As a complex structure example, we have assembled in a clean anhydrous and dust free atmosphere, 675 fluoride glass optical fibers with a sheath diameter of 800 microns to provide a cylindrical mold of approximately 20 mm. This mold was then stretched into a 500 micron diameter fiber.

EXAMPLE 11

In FIG. 9, we have shown a striction cone and the start of a fiber 19 obtained form a complex structure of 12 index jump optical fiber 20 among which were placed 9 single fibers 21, the assembly being carried out as described in example 10.

Of course, any complex structured component can be used as an element of a more complex structure. It is also clear that the components can be shaped using conventional glassware techniques to form in particular discs, prisms, lenses and complex structured optical components.

CONCLUSIONS

The optical fibers and components in accordance with the invention can be used for a large number of applications involving telecommunications, data transfer, imaging of intrared systems, remote sensing and optical fibering sensors, the transfer of power, etc.

At a wavelength higher than 2 microns, the use of fluoride glass optical fibers offers the advantage of being relatively insensitive to ionizing radiation (neutrons, alpha, beta and gama rays) which only slightly affect the optical characteristics of oxide glass fibers. It is thus suitable for the transfer of data in radioactive areas.

Fluoride glass optical components, in the shape of fibers, ribbons, cones and bubbles, allow a reduction in weight and a conceptual simplification of infrared detection systems. It is for example possible to do the transfer, the coding and the decoding of an infrared picture between the focal plain and the detector. The latter, being usually cooled to a low temperature is relatively stable while infrared optics may fluctuate.

The same components may be coupled to mid range infrared lasers such as HF and DF lasers to transfer from a single source an appreciable optical power in different zones and or difficult to access areas.

The invention essentially concerns different types of glass derived from heavy metal fluorides such as fluorozirconates, fluorhafnates, fluoroaluminates, fluorozincates, the transition metal fluorides, the lantinites or actinites. These types of glass may be enriched with heavy halogens—chlorides, bromides, iodides—without modifying the process for a mole concentration of up to 10%.

The processes described are applicable in particular to types of glass containing in excess of 30% in mole concentration of $ZrF_4$ or $HfF_4$, or in excess of 15% of $AlF_3$, or an excess of 20% $ZnF_2$, or of a 3d transition metal fluoride, or in excess of 25% of $UF_4$, of $ThF_4$ or of a rare earth fluoride, these examples being solely given as an indication and not intended to be all inclusive. We however, exclude from the scope of the invention types of glass containing an appreciable proportion of oxygenated vitrificating agents such as $SiO_2$, $B_2O_3$, $GeO_2$ and $P_2O_5$.

We claim:

1. A process to manufacture optical fibers and components from bars or molds of fluoride glass consisting in the drawing out of optical quality molds from highly pure fluoride glass and the stretching or the fibering of said molds into optical fibers characterized in that these operations on fluoride glass are carried out in a dry atmosphere free of dust, organic, metallic or mineral vapors under high temperatures until dehydration of the fluoride glass occurs.

2. A manufacturing process in accordance with claim 1, characterized in that the drawing out operations of the mold and the stretching and fibering are carried out in a vacuum.

3. A manufacturing process in accordance with claim 1, characterized in that the process of drying out the molds, stretching and fibering are carried out in a helium atmosphere.

4. A process to manufacture fluoride glass optical fibers in accordance with claim 1, characterized in that the mold is obtained by pouring sheath glass into a slightly conical revolving mold, then removing the liquid core and pouring at the center of the tube thus forming the core glass.

5. A process to manufacture fluoride glass optical fibers in accordance with claim 4, characterized in that the mold is externally corrected and polished in order to keep the same ratio between the core diameter and the sheath diameter over the whole length used for fibering.

6. A process to manufacture fluoride glass optical fibers in accordance with claim 1, characterized in that the mold is obtained by pouring the sheath glass in the lower portion of a preheated mold and the core glass its upper portion, then by opening the bottom of the mold such that the core glass is transferred inside the sheath glass tube, by replacing the liquid sheath glass which escaped through the bottom of the mold.

7. A process to manufacture fluoride glass optical fibers in accordance with claim 1, characterized in that the mold is obtained by simultaneously extruding soft core glass and sheath glass through an orifice of the size of the required 8. A process to manufacture fluoride glass optical fibers and components in accordance with claim 1, characterized in that it is applicable to fluorizoconate, fluorozincate, fluoroaluminate, glass or glass derived from transition metal fluorides, from lanthanides or actinides.

9. A process to manufacture glass optical fibers in accordance with claim 1, characterized in that the heating system allowing the fibering and stretching consists of a hot gas flow.

10. A process to manufacture fluoride glass optical fibers in accordance with claim 1, characterized in that the mold or the tube are obtained by contraction of a larger diameter tube.

11. A process to manufacture fluoride glass optical fibers in accordance with claim 10, characterized in that the mold is the fluoride glass tube whose ends are held in chucks that can translate and rotate around the connecting axis, an oven being placed between the chucks and surrounding the tube, the floride glass tube 16 being linearly displaced and turned in front of the oven by the said trunks.

12. A process to manufacture fluoride glass optical fibers in accordance with claim 10, characterized in that the mold is obtained from a tube made by pouring different layers of glass in a cylindrical cone mold rotating about its generator.

13. A process to manufacture fluoride glass optical fibers in accordance with claim 1, characterized in that the mold or the tube used to manufacture the mold are obtained by stretching either a tube or a mold of larger diameter.

14. A process to manufacture complex structured fluoride glass wave guides in accordance with claim 1, characterized in that it consists of the complex structured bar obtained by surface melting of elementary fibers.

15. A process to manufacture fluoride glass optical components, characterized in that they are obtained by stretching, contracting or fibering the components in accordance with claim 14.

16. A process to manufacture complex structured fluoride glass molds, in accordance with claim 1, characterized in that it is made by assembling bars, tubes, molds, fibers, and capillaries, the assembly being obtained by surface fusion of adjacent components.

17. A process for manufacturing optical fibers and components from bars or molds or fluoride glass, said process consisting in drawing out optical quality molds from highly pure fluoride glass and stretching or fibering said molds into optical fibers characterized in that these operations are carried out in a dry atmosphere free of dust, organic, metallic or mineral vapors; said process further being for the preparation of a low hydroxyl content fluoride glass to be used in the manufacturing of optical fibers and components, characterized in that the dehydration of the fluoride mixture to obtain the glass is done by the steps of prolonged heating at under 450° C. in the presence of fluoride or ammoniumbifluoride, and holding the molten mixture at a high temperature until dehydration occurs, these different steps being carried out in an anhydrous atmosphere.

18. A process to obtain low hydroxyl content fluoride glass in accordance with claim 17, characterized in that the dehydration or fluorization stage is carried about under a reduced pressure.

19. A process to obtain low hydroxil content fluoride glass in accordance with claim 17, characterized in that the atmosphere above the material being dehydrated or fluorized contains between 1 and 25% of oxygen.

20. A process to prepare low hydroxyl content fluoride glass from metal oxides, intended to be used in the manufacturing of optical fibers and components in accordance with one of claims 1 to 3, characterized in that the fluoridation of the oxide is carried out by prolonged heating below 450° C. in the presence of fluoride or ammoniumbofluoride and such that a later refinement stage is carried out by holding the molten mixture at a high temperature until dehydration occurs, these various operations being carried out in an anhydrous atmosphere.

21. A process for manufacturing optical fibers and components from bars or molds of fluoride glass, said process consisting in drawing out optical quality molds from highly pure fluoride glass and stretching or fibering said molds into optical fibers characterized in that these operations are carried out in a dry atmosphere free of dust, organic, metallic or mineral vapors; said process further being for the preparation of a low hydroxyl content fluoride glass to be used in the manufacturing of optical fibers and components, characterized in that the dehydration of the fluoride mixture to obtain the glass is done by the steps of prolonged heating at under 450° C. in the presence of fluoride or ammoniumbifluoride, and holding the molten mixture at a high temperature until dehydration occurs, and further characterized in that the drawing out operations of the mold and the stretching and fibering are carried out in a vacuum.

22. A process for manufacturing optical fibers and components from bars or molds of fluoride glass, said process consisting in drawing out optical quality molds from highly pure fluoride glass and stretching or fibering said molds into optical fibers characterized in that these operations are carried out in a dry atmosphere free of dust, organic, metallic or mineral vapors; said process further being for the preparation of a low hydroxyl content fluoride glass to be used in the manufacturing of optical fibers and components, characterized in that the dehydration of the fluoride mixture to obtain the glass is done by the steps of prolonged heating at under 450° C. in the presence of fluoride or ammoniumbifluoride, and holding the molten mixture at a high temperature until dehydration occurs, and further characterized in that the process of drying out the molds, stretching and fibering are carried out in a helium atmosphere.

* * * * *